United States Patent [19]
Grossmeyer

[11] Patent Number: 5,835,665
[45] Date of Patent: Nov. 10, 1998

[54] SIMPLIFIED VCR PROGRAMMER

[75] Inventor: Mark C. Grossmeyer, Cedarburg, Wis.

[73] Assignee: Joseph Enterprises, Inc., San Francisco, Calif.

[21] Appl. No.: 813,185

[22] Filed: Mar. 10, 1997

[51] Int. Cl.[6] .............................. H04N 5/91; H04N 7/00
[52] U.S. Cl. ................................. 386/83; 386/46
[58] Field of Search ................... 386/83, 92, 46; 360/32; 348/731, 734, 732, 7, 6, 13; H04N 5/91, 7/00

[56] References Cited

U.S. PATENT DOCUMENTS

| | | | |
|---|---|---|---|
| Re. 35,343 | 10/1996 | Shimada et al. .................. | 386/10.3 |
| 3,778,721 | 12/1973 | Moran . | |
| 4,081,754 | 3/1978 | Jackson ............................ | 325/396 |
| 4,228,543 | 10/1980 | Jackson ............................ | 455/181 |
| 4,325,081 | 4/1982 | Abe et al. ....................... | 358/127 |
| 4,706,121 | 11/1987 | Young . | |
| 4,786,982 | 11/1988 | Wakahara et al. . | |
| 4,809,117 | 2/1989 | Friedman . | |
| 4,866,434 | 9/1989 | Keenan . | |
| 4,866,542 | 9/1989 | Shimada et al. ................. | 360/10.3 |
| 4,908,713 | 3/1990 | Levine ............................. | 358/335 |
| 4,963,994 | 10/1990 | Levine ............................. | 358/335 |
| 4,977,455 | 12/1990 | Young ............................. | 386/83 |
| 5,056,070 | 10/1991 | Shibuya et al. ................. | 368/10 |
| 5,063,543 | 11/1991 | Shibuya et al. ................. | 368/29 |
| 5,123,046 | 6/1992 | Levine . | |
| 5,142,398 | 8/1992 | Heep . | |
| 5,187,469 | 2/1993 | Evans et al. . | |
| 5,189,517 | 2/1993 | Ohara . | |
| 5,228,077 | 7/1993 | Darbee . | |
| 5,412,377 | 5/1995 | Evans et al. . | |
| 5,436,625 | 7/1995 | Kubo .............................. | 341/22 |
| 5,457,448 | 10/1995 | Totsuka et al. . | |
| 5,508,815 | 4/1996 | Levine ............................. | 358/335 |
| 5,515,173 | 5/1996 | Mankovitz et al. .............. | 358/335 |
| 5,552,917 | 9/1996 | Darbee et al. . | |
| 5,724,106 | 3/1998 | Autry et al. ..................... | 348/734 |

*Primary Examiner*—Robert Chevalier
*Attorney, Agent, or Firm*—Philip H. Albert; Townsend and Townsend and Crew LLP

[57] ABSTRACT

A simplified VCR programmer provides only the essential input controls required for programming a VCR to perform timer activated recording of television programs. The invention performs seven day single event programming including weekly recording or Monday through Friday (M–F) daily recording. This simplified VCR programmer includes directly manipulable input controls for setting the record start time including AM or PM, the record stop time and the day of the week. The VCR programmer also includes a liquid crystal display (LCD) that displays the correct time and day of the week, and an infrared (IR) transmitter for transmitting the manufacturers' record codes and stop codes stored in the VCR programmer. The real time clock on the LCD is set by three push-button switches to set the day, hour and minute of the clock. A test push-button switch tests the record code function by sending out the stored record codes to the VCR receiver. All of the manufacturers' record and stop codes for most major VCR brands are transmitted sequentially by the IR transmitter to the VCR at the preprogrammed times.

19 Claims, 9 Drawing Sheets

SIMPLIFIED VCR PROGRAMMER

BACKGROUND OF THE INVENTION

The invention relates to video cassette recorder (VCR) programmers. In particular, the invention relates to a VCR programmer remote control that simplifies the programming of a VCR for performing automatic timer activated recording of television programs.

VCR's are commonly used as accessories for televisions to record television programs for later replay. To conveniently program a VCR, many commercially available VCR's are equipped with remote controls. The VCR remote controls are used to control virtually every function available on the VCR. However, many of these remote controls have a large number of buttons and switches that make their use very complex and confusing. Programming a VCR to perform automatic timer activated recording usually requires numerous time consuming operations to complete a programming sequence.

The automatic timer activated recording feature of a VCR lets you program the VCR from a remote control to perform unattended recording at predetermined set times. For each television program you choose to record, the VCR will turn itself on at the scheduled time, do the recording, and turn itself off automatically. Typically, timer activated recording requires numerous steps to be performed on a remote control for the VCR to be programmed. The most common ways to program a VCR for automatic timer activated recording include remote programming, on-screen programming (using the remote control in response to menus displayed on the TV screen), or using controls on the VCR itself.

Programming a VCR for timer activated recording using a remote control can take up to ten or more separate operations. The problem is that the procedure for programming a VCR to record a television program in advance can be very complex and confusing for many people. It takes much longer than it has to. In fact, it can be so confusing to program a VCR that many people don't attempt to do it at all. There are too many confusing steps that often result in mistakes being made in the programming.

Because the process of programming a VCR is notoriously difficult and confusing, there is a need for a simpler system for programming VCR's to record television programs. The present process of entering a lengthy sequence of information and operations is much too complex, confusing and tedious.

Other techniques have been developed to simplify the process of timer activated recording of VCR's. Some of these techniques include entering bar code information with a light pen, entering instructions through a computer or a modem, or the VCR Plus system. All these techniques are also overly complex and time-consuming. Some even require the use of special equipment.

The VCR Plus system uses compressed codes for television programs found in printed television listings. The user must first find a television listing with the VCR Plus codes, and then input them into a separate unit. Another problem with the VCR Plus system is that the user must perform an initial set-up procedure that includes entering the brand name and model number of the user's VCR and cable TV converter box into the programmer, setting the clock on the programmer, and entering a local channel map which maps national channel numbers for certain network's cable channels into the actual channel numbers used by the user's cable system. This procedure is still overly complex and time-consuming.

Most universal VCR remote controls store the manufacturers' codes in memory. In order for the universal remote control to work with a user's particular VCR requires an initial set-up procedure. This initial set-up procedure requires the user to select from a list of manufacturers' codes, the particular brand of VCR, and enter that code into the remote control. The user must then verify that the code works for his or her particular brand of VCR. If it does not, then the user must try another code until he or she finds the one that works with their particular VCR. After this procedure, the universal VCR remote control is set to work with one particular brand of VCR. It will not work with any other brand unless it is reprogrammed. Again, this process is complex and time-consuming.

The present invention is directed toward a VCR programmer that simplifies programming a VCR to perform automatic timer activated recording of television programs. It is easier to use, less complicated and less time-consuming than existing systems. The simplification is achieved by including only the essential input controls required for performing timer activated recording. The input controls are dedicated to one function simplifying the use of the VCR programmer. Whereas most VCR programmer remote controls have complex configurations with a large number of input controls, the present invention has just the essential input controls for performing VCR timer activated recording.

The simplified VCR programmer provides an improved device for programming the record start time, the record stop time and the day of the week required for VCR recording. This device is substantially simpler, faster to use and less error prone than present VCR programmers. Merely install batteries, set the clock and you are ready to program your VCR to record a television program. The present invention requires no manufacturers' code set-up. The VCR programmer reduces the number of input control commands and removes the complexities of a conventional VCR programming remote control.

The user initiates the programming routine by selecting the record start time including AM or PM, the record stop time and the day of the week of the desired television program to be recorded. Input control switches for record start time, record stop time and day of the week supplant all of the push-buttons, selector switches and other input controls employed in prior art VCR programming remote controls. Thus, it is desirable to provide a VCR programmer that is substantially simpler, faster to use and less error prone than prior art systems.

BRIEF SUMMARY OF THE INVENTION

The invention is a simplified VCR programmer that is so fast, easy and intuitive in function, that almost anyone will be able to use it. The invention accomplishes this by providing a simplified VCR programmer that is dedicated only to automatic timer activated recording. The invention performs seven day single event programming including weekly recording or Monday through Friday (M–F) daily recording. The VCR programmer includes only the essential input controls required for programming a VCR for timer activated recording. Each input control is dedicated to only one function. The user selects the record start time including AM or PM, the record stop time and the day of the week. The invention utilizes directly manipulable input controls for setting the record start time, the record stop time and the day of the week. All of the options of the input controls are visible to the user through markings on the face of the VCR programmer. This makes the invention fast, easy and intuitive to use.

The invention eliminates the manufacturers' code set-up that is required by prior art universal VCR programming remote controls. The VCR programmer in this invention is similar to known universal remote controls in that it stores the manufacturers' record and stop codes for most major VCR brands. However, the VCR programmer is unique in that the user does not have to "set-up" the programmer for their particular VCR. The VCR programmer works with all VCRs without any manufacturers' code set-up. The VCR programmer accomplishes this by storing the record and stop codes of the major VCR brands in memory. All of the record codes are transmitted sequentially at the record start time. Each code is transmitted multiple times to improve VCR receiver reliability. When the user's VCR receives its particular record start code, the VCR starts recording. When the stop time is reached, all of the stop codes stored in the programmer are transmitted to the VCR sequentially, with each code being transmitted multiple times for reliability. When the VCR receives its particular stop code, it stops recording.

In one aspect, the simplified VCR programmer remote control includes a rotary dial switch with a 12 hour clock face for setting the record start time, an AM/PM slider switch for selecting AM or PM of the record start time, a liquid crystal display (LCD) that displays the current time and the day of the week, a day of the week slider switch for initiating the programmer and selecting the day of the week in which the recording is to be performed, and a second rotary dial switch with a 12 hour clock face for setting the record stop time. The two rotary dial switches are 24 position switches with half-hour detents so that the record start and stop times may be set in one-half hour increments. The VCR programmer also includes an infrared light emitting diode (IR LED) for transmitting the record codes and stop codes to the VCR receiver. The real time clock on the LCD is set by three push-button switches to set the day, hour and minute of the clock. A test push-button switch tests the record function by sending out the stored record codes to the VCR receiver. This is to ensure that the VCR programmer has the correct codes stored in its memory for the user's particular VCR and to make sure that the programmer is correctly positioned so that the VCR will receive the transmitted IR signal. Once the correct code is received by the VCR, it starts recording. The user then ends the test by manually stopping the recording on the VCR, or by manually turning off the VCR.

The record codes and stop codes stored in the VCR programmer's memory are transmitted sequentially by the IR transmitter, or other suitable transmitter such as an ultrasonic or radio frequency (RF) transmitter. Each code is transmitted multiple times to increase reliable reception by the VCR. Recording starts when the VCR receives the correct record code. All the record codes are sequentially transmitted when the selected record start time (including AM/PM) and the day of the week match or coincide with the real time clock on the programmer's LCD. When the real time clock matches or coincides with the selected record stop time all the stop codes are sequentially transmitted from the VCR programmer to the VCR receiver. The recording process is terminated when the VCR receives the correct stop code.

The simplified VCR programmer remote control is also universal, meaning it will work with the major VCR brands on the market. All the record codes and stop codes are programmed into the programmer's memory. The VCR programmer sequentially transmits the codes to the VCR once the selected record start time or record stop time and day match or coincide with the real time clock. Once the correct code is received by the VCR, it either starts recording or stops recording, depending upon the code received. Each code is transmitted multiple times to improve reliable reception by the VCR. The codes are transmitted at a predetermined time before and after the program to ensure that the complete television program is recorded.

In another aspect, the simplified VCR programmer remote control utilizes individual push-button switches for selecting the record start time, the record stop time, and the day of the week. This simplified VCR programming remote control includes an LCD that displays the current time (including AM/PM) and the day of the week, or the record start time, the day of the week and the record stop time. A first push-button switch is labelled start time. To select a particular start time, the user merely pushes the start time push-button and the time is incremented on the LCD in one-half hour increments each time the button is pushed. The push-button is sequentially pushed until the preferred record start time is selected. The second push-button switch is labelled stop time and operates in a similar manner to the start time push-button. The last push-button switch is labelled day and is pushed to select the day of the week when the recording is to be performed. The day push-button includes an OFF setting for turning off the programming function, and a M–F setting for daily recording during the week.

In another aspect, the simplified VCR programmer input controls may be combined with a conventional universal VCR remote control so that the automatic timer activated recording function of a VCR may be more easily programmed. In this aspect, a conventional VCR remote control with its numerous input controls will be combined with simplified input controls for setting the record start time, record stop time and day of the week. In this way, all of the many functions of a VCR may be controlled and programmed by one universal VCR remote control, while providing simplified controls on the same remote control for programming a VCR to perform automatic timer activated recording.

An object of the invention is to provide a VCR programmer that is so fast, easy and intuitive in function, that almost anyone will be able to use it.

Another object of the invention is to eliminate the manufacturers' code set-up that is required by prior art universal VCR programmer remote controls.

Other objects and advantages of the invention may be apparent to those skilled in the art upon reviewing the following drawings and description thereof.

DETAILED DESCRIPTION OF THE INVENTION

Figure 1:
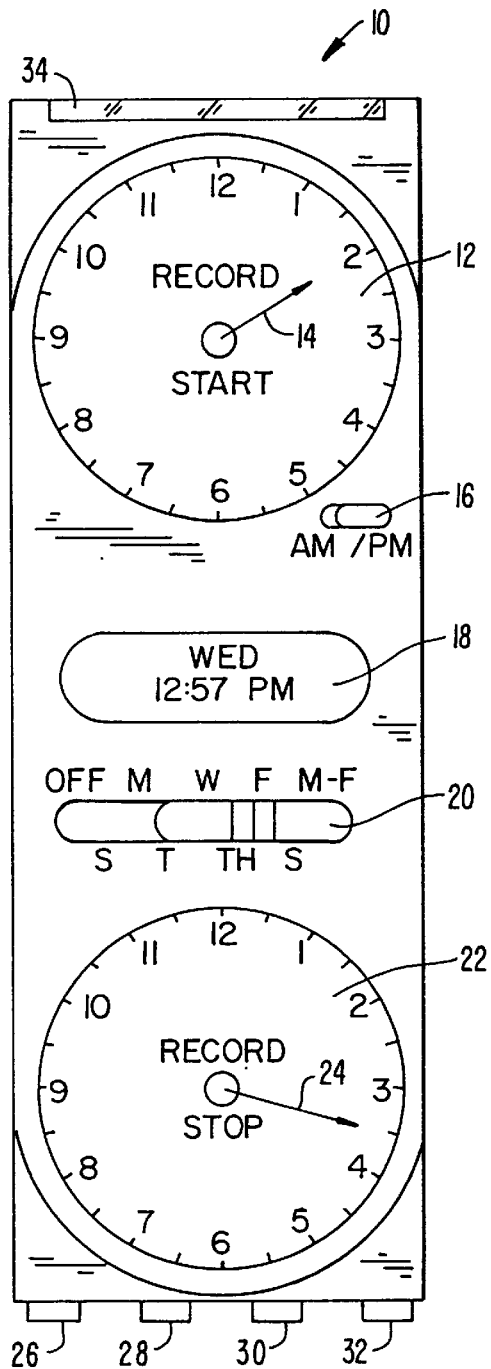
FIG. 1 is a top view of a simplified VCR programmer in accordance with a first embodiment of the invention.

FIG. 1 shows a simplified VCR programmer remote control 10. The VCR programmer 10 includes a 24 position rotary dial switch 12 having a 12 hour clock face with a single hand 14 and half-hour detents for setting the record start time, an LCD 18 that displays the real time, day and codes being transmitted, an AM/PM slider switch 16 to be used in selecting AM or PM of the record start time, a day of the week slider switch 20 for selecting the day of the week for the recording, and a 24 position rotary dial switch 22 having a 12 hour clock face and a single hand 24 for setting the record stop time. Both rotary dial switches 12 and 22 have a 12 hour clock face with half-hour detents for setting the record start and record stop times for a timer activated recording programming sequence. To set a time, the single handles 14, 24 are set to the desired starting and stopping times on the rotary dial clock face. The day of the week slider switch 20 has settings for OFF, Sunday, Monday, Tuesday, Wednesday, Thursday, Friday, Saturday and M–F. In the Off position, the simplified VCR programmer remote control will not transmit any record or stop codes. The M–F switch setting is used to record a program each Monday through Friday at the same scheduled time. This is useful for television programs that are broadcast on Monday through Friday at the same scheduled time.

The VCR programmer 10 also includes four push-button switches for setting the real time clock and for testing the record codes stored in the VCR programmer remote control 10. These push-button switches are test 26, day 28, hour 30, and minute 32. After pushing the test push-button 26, record codes that are stored in memory within the VCR programmer 10 are transmitted by an IR transmitter 34 to a VCR receiver for verifying that the remote control 10 has the correct record code stored in its memory for that particular VCR. The test push-button 26 can also be used to verify that the VCR programmer 10 is positioned correctly for the VCR to receive the transmitted codes. Once the correct record code is received by the VCR, the VCR begins recording. To terminate the test sequence, the user must manually stop the recording by manually stopping or turning off the VCR at the VCR. The day 28, hour 30 and minute 32 push-buttons are used to set the current time on the real time clock of the VCR programmer remote control 10.

Figure 2:
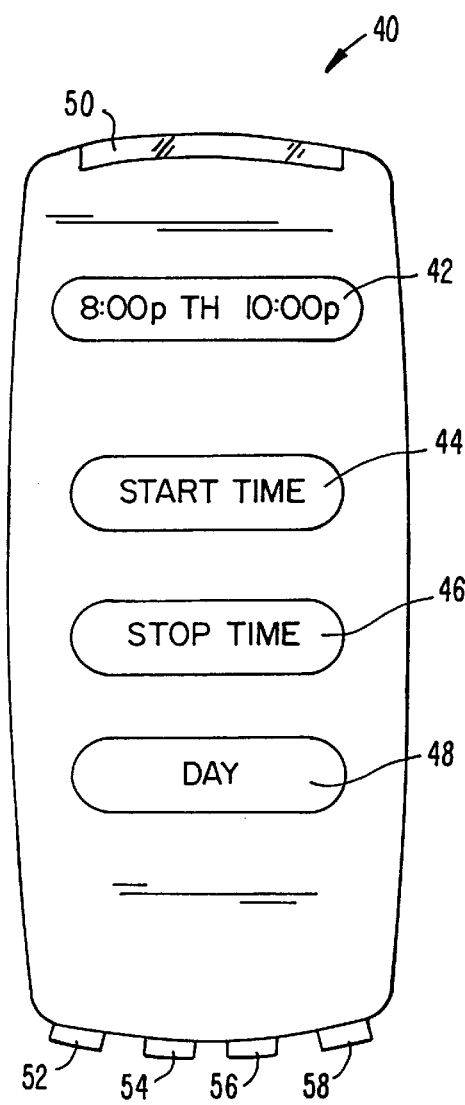
FIG. 2 is a top view of a simplified VCR programmer in accordance with a second embodiment of the invention.
Figure 3A:
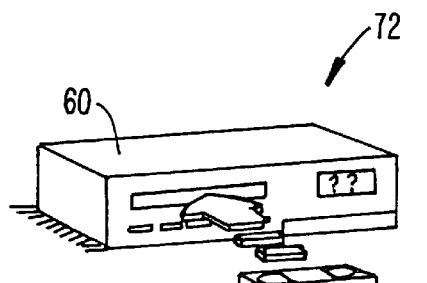
FIG. 3 is a flow diagram showing the operation of the invention.
Figure 3B:
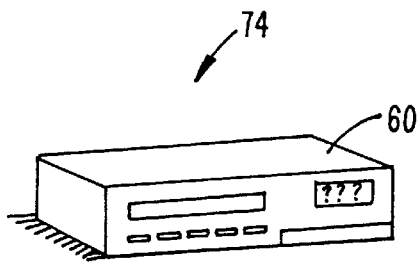
Figure 3C:
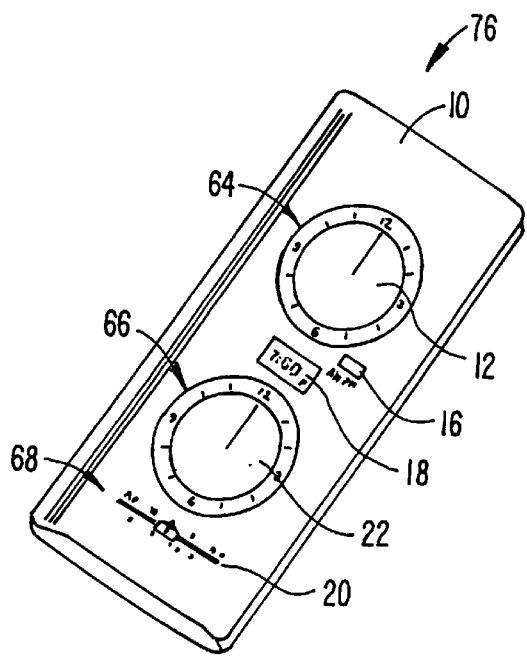
Figure 3D:
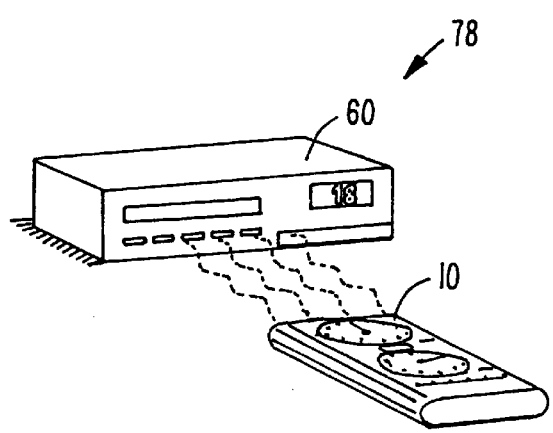

FIG. 2 shows a second embodiment of the present invention. In this embodiment, a simplified VCR programmer remote control 40 includes an LCD 42 that displays the real time and day of the week, or the record start time, record stop time and day of the week. The VCR programmer 40 also includes a record start time push-button 44 for selecting a record start time, a record stop time push-button 46 for selecting a record stop time and a day push-button 48 for selecting the day of the week for the recording. All three push-buttons function the same way. To select a recording start or stop time, the proper push-button 44, 46 is pressed to sequentially scan through the times shown on the LCD 42. Once the desired start time is selected, the user then goes on to select the desired stop time and day of the week. Each time push-button 44 or 46 is pressed, the time is incremented by one-half hour increments. A day of the week push-button switch 48 has settings for OFF, Sunday, Monday, Tuesday, Wednesday, Thursday, Friday, Saturday and M–F. In the OFF state, the current time and day is displayed on the LCD 42. In all other states, the LCD 42 displays the programmed record start time, the record stop time and the day of the week.

This embodiment also includes four push-buttons designated test 52, day 54, hour 56 and minute 58. Again, these push-buttons have the same function as in the first embodiment of the present invention. The test push-button 52 is used to verify that the correct record codes are stored in memory within the VCR programmer remote control 40 and that the remote control 40 is positioned correctly for the VCR to receive the transmitted codes. The day 54, hour 56, and minute 58 push-buttons are used for setting the real time clock on the VCR programmer remote control 40.

In a further embodiment, the simplified VCR programming input controls 12, 44; 22, 46; 20, 48; and 16 may be combined with a conventional universal VCR remote control to simplify programming the timer activated recording function of a VCR. In this embodiment, a conventional universal VCR remote control with its numerous push-buttons and other input control switches are combined with simplified input controls for setting the record start time 12, 44; record stop time 22, 46; and day of the week 20, 48 as shown in FIGS. 1 and 2. The conventional universal VCR input controls are on one side of the remote control while the simplified VCR programmer input controls are on the other side. In this way, all of the many functions of a VCR may be controlled and programmed by one universal VCR remote control, while providing simplified controls on the same remote control for programming a VCR to perform automatic timer activated recording.

FIG. 3 is a flow diagram showing the operation of the VCR programmer remote control 10 for programming a VCR 60 to perform automatic timer activated recording of television programs. Initially, the VCR programmer remote control 10 day switch 20 should be set to OFF and the real time clock properly set to reflect the current time. The VCR 60 and cable converter box (if applicable) must be turned on. The television may be turned off. The first step 72 is to turn on the VCR 60 and insert a videotape 62. The next step 74 is to set the VCR 60 or cable converter box (if applicable) to the desired channel you want to record. The channel selection is not made on the VCR programmer remote control 10. Then in step 76 the user must set the record start time including the AM or PM 64 using rotary dial switch 12 and AM/PM slider switch 16, set the record stop time 66 using rotary dial switch 22, and set the day of the week 68 using slider switch 20. Then in step 78, the user must position the VCR programmer remote control 10 so that the transmitted record and stop codes are received by the VCR 60.

All the record and stop codes for the major VCR brands are stored in the VCR programmer remote control 10 memory. At the pre-programmed times, the VCR programmer remote control 10 sequentially transmits all the record and stop codes stored in its memory. Each code is transmitted multiple times to increase reliable reception by the VCR 60. Recording starts when the VCR 60 receives the correct record code. Recording stops when the VCR receives the correct stop code.

Figure 4:
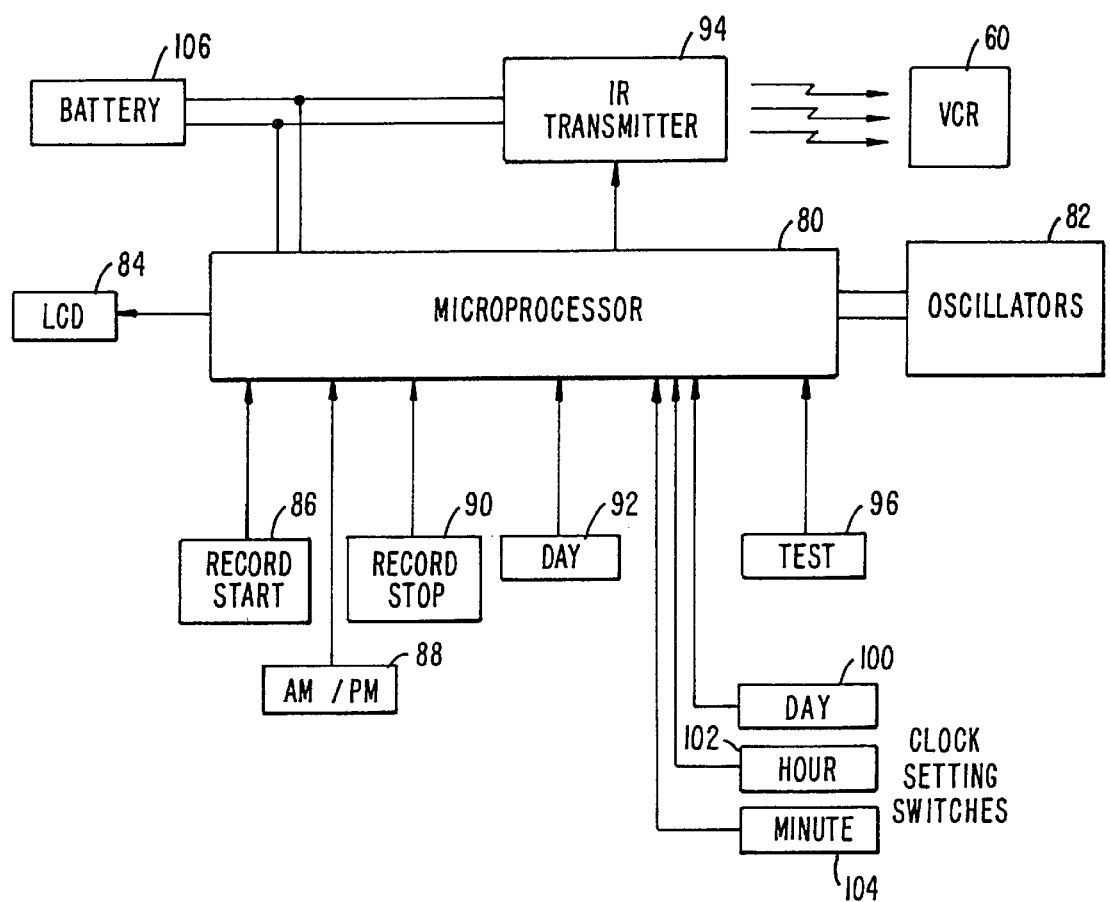
FIG. 4 is a block diagram of the invention.

FIG. 4 is a block diagram of the simplified VCR programmer remote control 10, 40. The circuitry includes microprocessor 80, oscillators 82, liquid crystal display (LCD) 84, record start time switch 86, AM/PM selector switch 88, record stop time switch 90, day selector switch 92, IR transmitter 94, and test switch 96. Clock setting switches include push-button switches for setting the day 100, hour 102, and minute 104. The microprocessor 80 is a four bit microprocessor with an LCD driver, 4K of RAM, two 12 bit timer/counters, and dual clock operation. The dual clock operation is implemented with oscillators 82 providing a high speed mode at 4 MHz and a low power mode at 32 kHz. During operation, the microprocessor 80 is normally in the low power mode. Periodically, the microprocessor 80 wakes up and goes into high speed mode to determine whether the record or stop codes should be transmitted to the VCR 60. If the pre-programmed record start, record stop and day do not match or coincide with the real time clock, then the microprocessor 80 goes back into the low power mode.

The microprocessor 80 and IR transmitter 94 are powered by battery 106. The microprocessor 80 and IR transmitter 94 are designed to operate on two AA batteries at 1.5 volts. The microprocessor 80 can be implemented with a Toshiba TMP47C422. The record start switch 86, AM/PM switch 88, record stop switch 90, day switch 92, test switch 96, and clock setting switches 100, 102, 104 all interface directly to microprocessor 80 through input ports. The microprocessor 80 also interfaces directly to LCD 84 and IR transmitter 94. Once the clock has been set, the contents of clock counters in microprocessor 80 are displayed on LCD 84. Microprocessor 80 monitors the switch settings of record start switch 86, AM/PM switch 88, record stop switch 90, and day switch 92. When the pre-programmed record start time, stop time and day coincide with the real time clock, microprocessor 80 sends all the record or stop codes to IR transmitter 94 to be transmitted to VCR 60. All the record and stop codes for the major VCR brands are stored in memory within the VCR programmer remote control 10, 40. All the record and stop codes are transmitted sequentially to the VCR enabling the VCR to receive its particular record or stop code. Each code is transmitted multiple times to improve VCR receiver reliability.

Figure 5A:
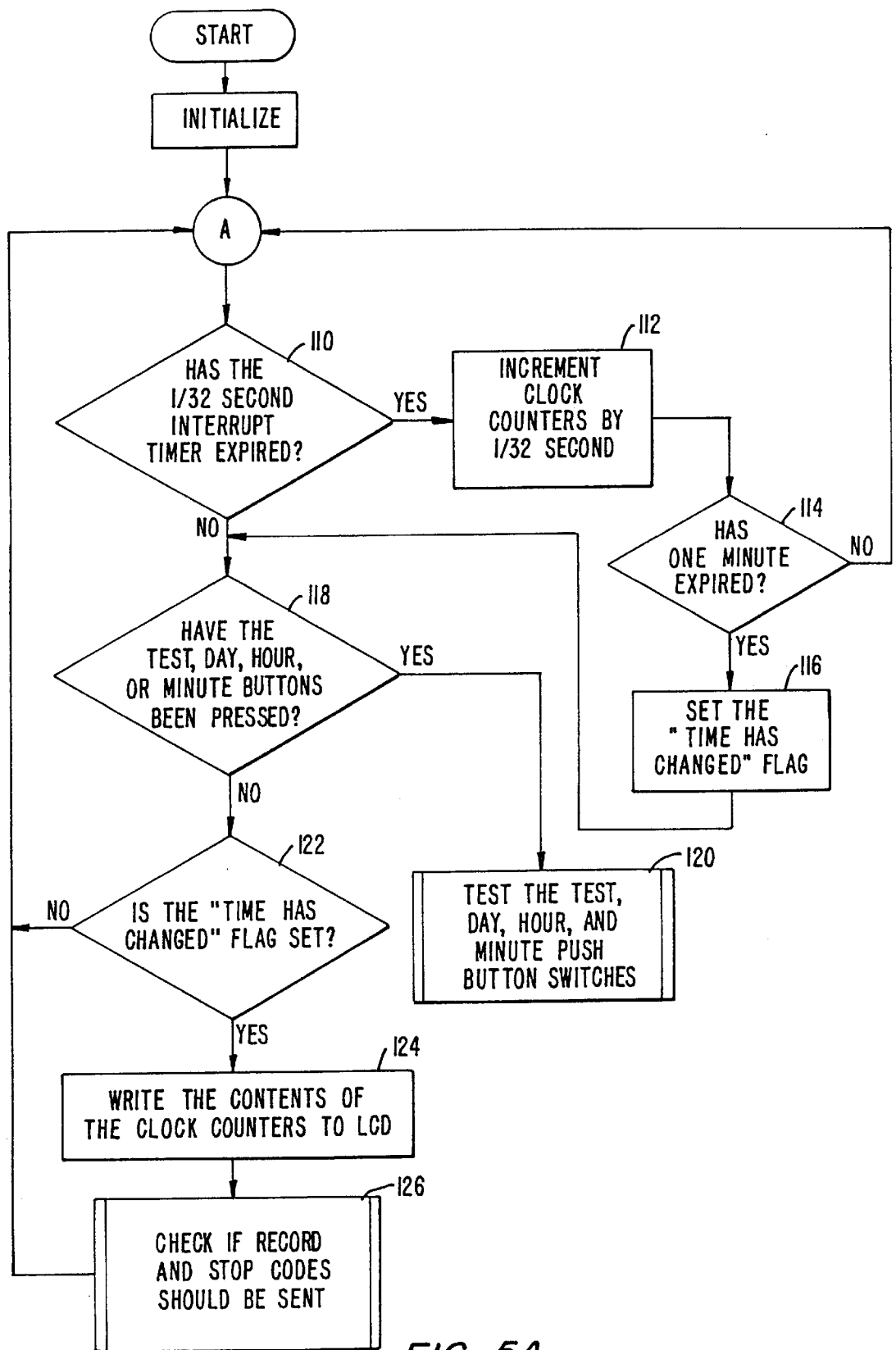
FIG. 5A is a flowchart showing the real time clock function of the simplified VCR programmer.

The flowcharts showing the inner workings of the microprocessor 80 are illustrated in FIGS. 5A–5G. FIG. 5A is a flowchart showing the real time clock function of the simplified VCR programmer 10, 40. In step 110, the microprocessor 80 determines if the ⅟₃₂ second interrupt timer has expired. If it has, then microprocessor clock counters are incremented by ⅟₃₂ second in step 112. The clock counters continue to be incremented until one minute has expired in step 114 and the time has changed flag is set in step 116. Next, the microprocessor 80 monitors the test 96, day 100, hour 102 and minute 104 push-buttons in step 118. If any of these push-buttons have been pressed by a user, then the software for testing the test 96, day 100, hour 102 and minute 104 push-buttons is executed in subroutine 120. If the time has changed flag is set in step 122, then the contents of the clock counters in microprocessor 80 are written to and displayed on LCD 84 in step 124. The microprocessor 80 then determines if the record and stop codes should be sent to the VCR 60 in subroutine 126.

Figure 5B:
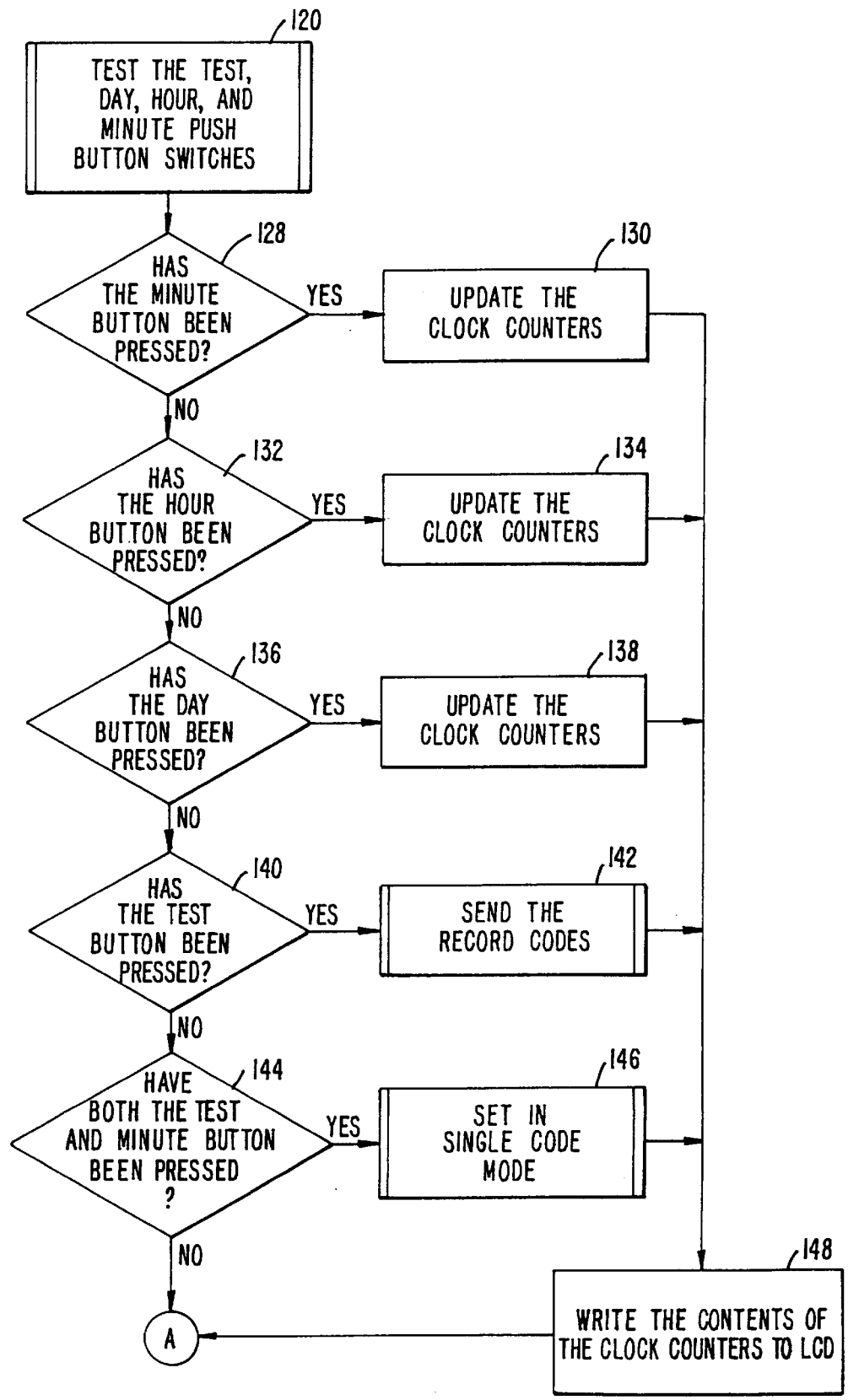
FIG. 5B is a flowchart showing the results of manipulating the test and clock setting push-button switches on the simplified VCR programmer.

FIG. 5B illustrates a flowchart for showing the results of pressing the test 96 and clock setting switches 100, 102, 104 on the VCR programmer 10, 40. In setting the clock, the microprocessor 80 monitors the push-buttons to determine if they have been manipulated. If the minute button 104 has been pressed in step 128, the clock counters in microprocessor 80 are updated in step 130 to show the minute being incremented on the real time clock. If the hour button 102 has been pressed in step 132, microprocessor 80 updates the clock counters in step 134 to show the hour being incremented on the real time clock. If the day button 100 has been pressed in step 136, microprocessor 80 updates the clock counters in step 138 to show that the day has been incremented on the real time clock. And if the test button 96 has been pressed in step 140, microprocessor 80 sends the record codes to the IR transmitter 94 in step 142 to be transmitted to the VCR receiver 60. If both the test 96 and minute 104 buttons have been pressed simultaneously in step 144, then the VCR programmer 10, 40 is set in a single code mode in subroutine 146. The contents of the microprocessor 80 clock counters are written to and displayed on LCD 84 in step 148.

Figure 5C:
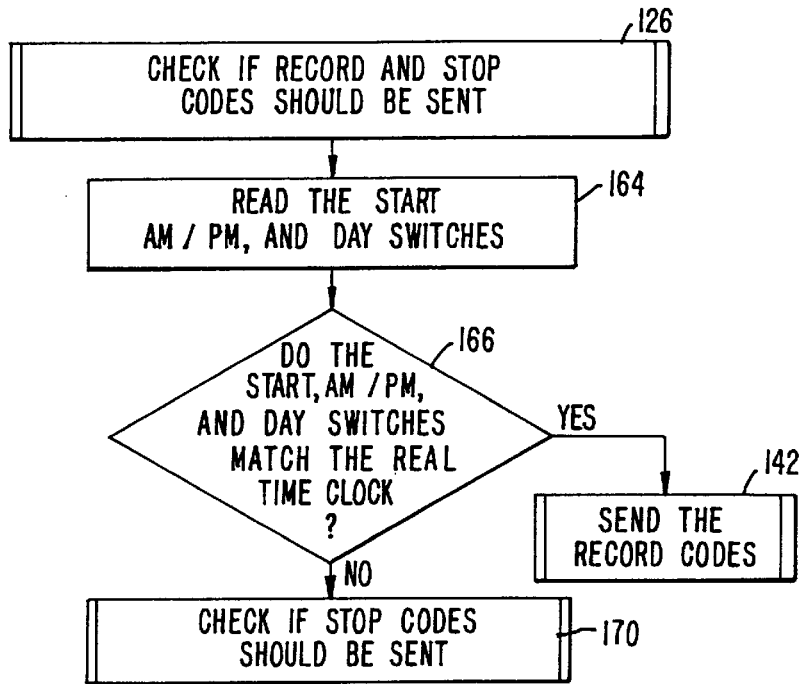
FIG. 5C is a flowchart showing the procedure of reading and comparing the record start and day switch settings with the real time clock.
Figure 5D:
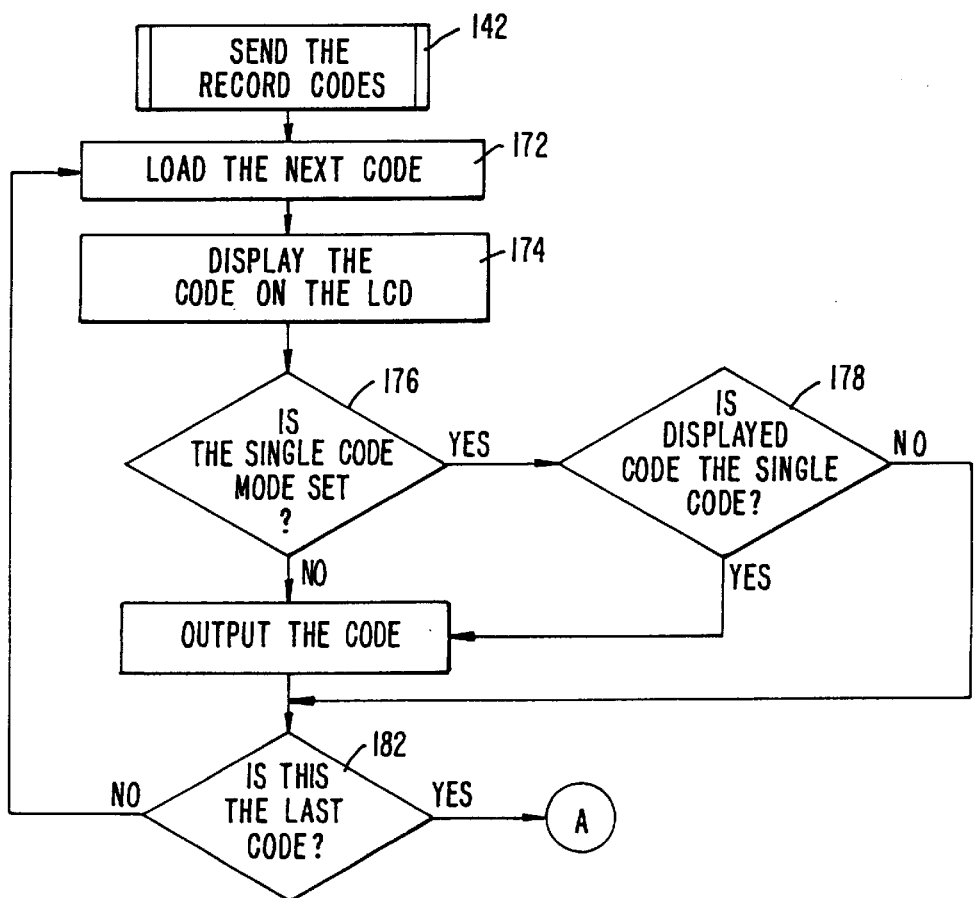
FIG. 5D is a flowchart showing the process of transmitting the record codes to the VCR receiver.
Figure 5E:
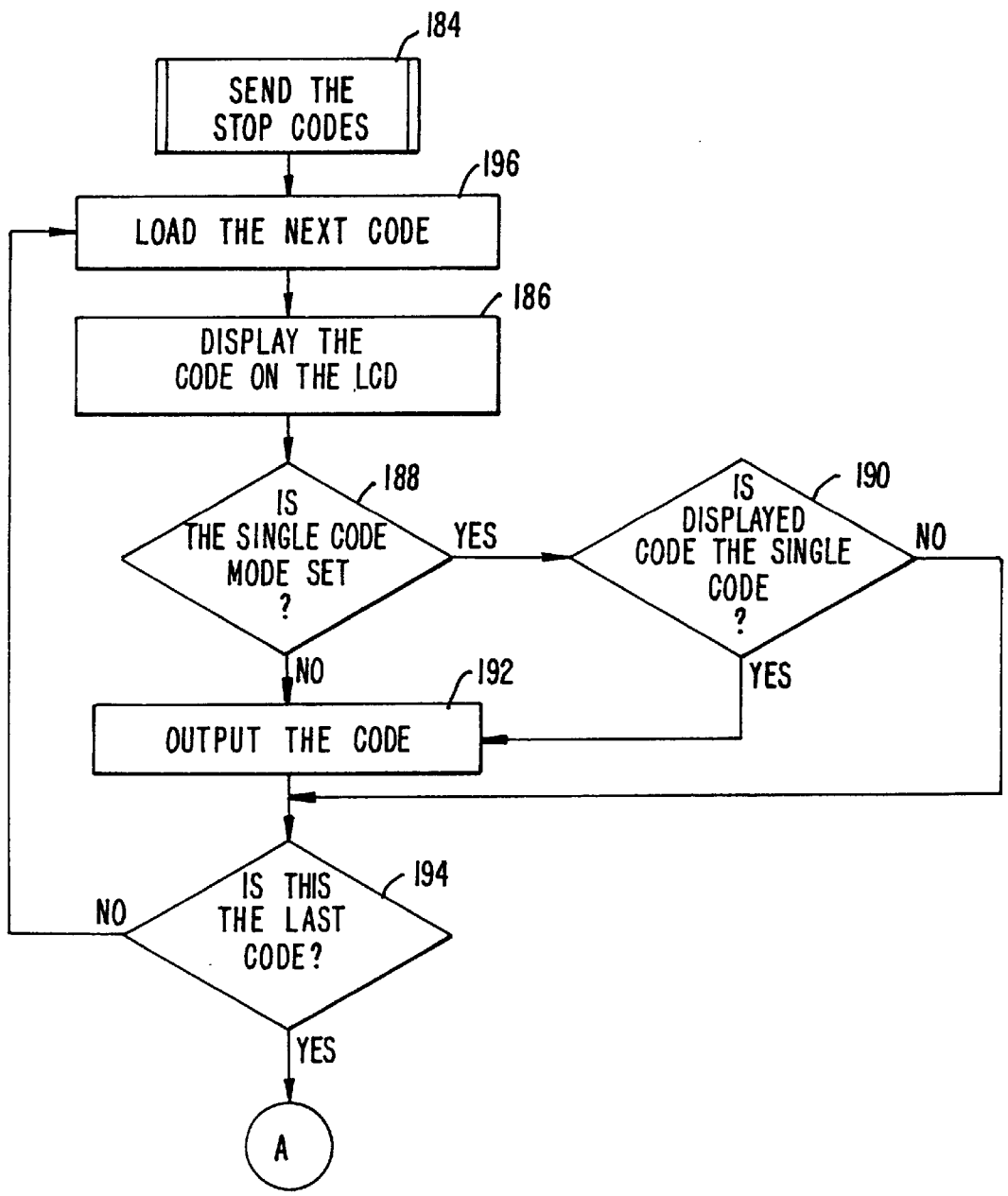
FIG. 5E is a flowchart showing the process of transmitting the stop codes to the VCR receiver.
Figure 5F:
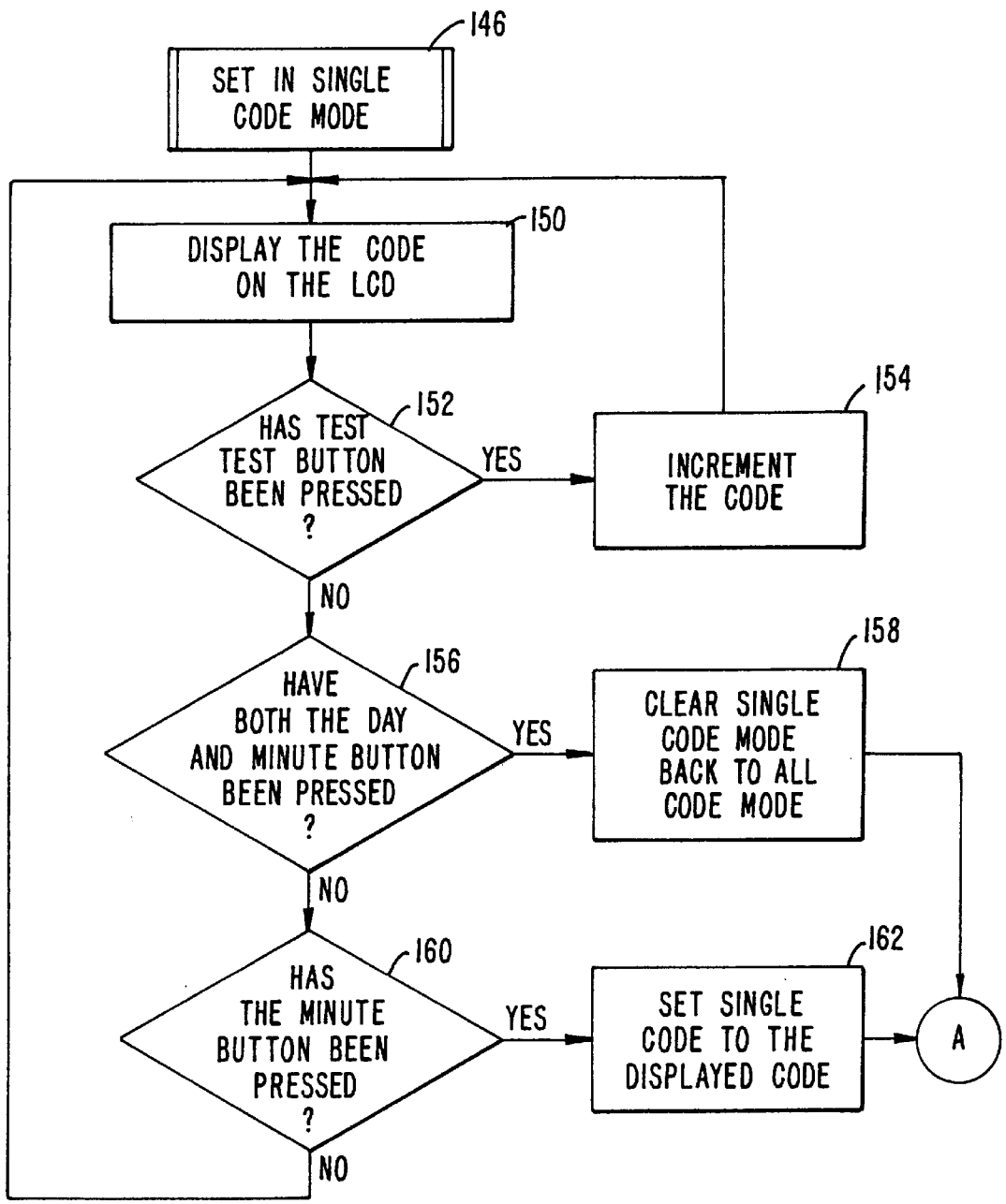
FIG. 5F is a flowchart showing the single code mode of the simplified VCR programmer.

The single code mode is detailed in the flowchart of FIG. 5F. The single code mode allows a user to select and send out only one record or stop code for a particular VCR brand. This mode is used when there is more than one VCR in a room that may be programmed by the transmitted record or stop codes. Since all the record and stop codes are transmitted for the major VCR brands, there is no way to distinguish between two or more VCRs except in the single code mode. The single code mode is set by pressing the test 96 and minute 104 buttons simultaneously. The first single code is displayed on the LCD 84 in step 150. If the test button 96 has been pressed in step 152, then the code is incremented to the next code in step 154 and each subsequent code is displayed on the LCD 84 in step 150. If the minute button 104 has been pressed in step 160, then the single code is set to the displayed code on the LCD 84 in step 162. To clear the single code mode back to the all code mode in step 158, the day 100 and minute 104 button must be pressed simultaneously in step 156.

FIG. 5C is a flowchart showing the sequence of events which take place as the microprocessor 80 reads and compares the record start 86, AM/PM 88 and day 92 switch settings to the real time clock in subroutine 126 to determine if the record and stop codes should be sent. The microprocessor 80 reads the record start 86, AM/PM 88 and day 92 switches in step 162. If the record start 86, AM/PM 88, and day 92 switch settings match or coincide with the real time clock in step 166, then the microprocessor 80 sends the record codes to be transmitted to the VCR receiver 60 in step 168 to initiate the recording process. If the record start 86, AM/PM 88, and day 92 switch settings do not match or coincide with the real time clock, then the microprocessor 80 checks to see if the stop codes should be sent.

FIG. 5D illustrates the process involved in transmitting the record codes to the VCR receiver 60. First, the record code is displayed on the LCD 84 in step 174. If the VCR programmer 10, 40 is set in the single code mode, step 176, and the displayed code is the single code, step 178, then that code is transmitted multiple times to the VCR 60, in step 180. However, if the VCR programmer 10, 40 is not set in single code mode but set in the all codes mode, then each and every record code stored in memory within the VCR programmer 10, 40 is transmitted sequentially to the VCR receiver 60 in step 180. All record codes are transmitted multiple times in sequence until the last code is sent, step 182. If the code transmitted is not the last code, then the microprocessor 80 loads the next code, step 172 and the process begins again.

The same process for sending the stop codes is shown in FIG. 5E. In the send the stop code subroutine 184, the stop codes are displayed on the LCD 84 in step 186. If the VCR programmer 10, 40 is set in the single code mode, step 188, and the displayed code is the single code, step 190, then that code is transmitted multiple times to the VCR 60 in step 192.

However, if the single code mode is not set and the VCR programmer 10, 40 is in the all codes mode, then each and every stop code stored in memory within the VCR programmer 10, 40 is transmitted to the VCR receiver 60 in step 192. All stop codes are transmitted multiple times in sequence until the last code is sent, step 194. If the code transmitted is not the last code, then the microprocessor 80 loads the next code, step 196, and the process begins again.

Figure 5G:
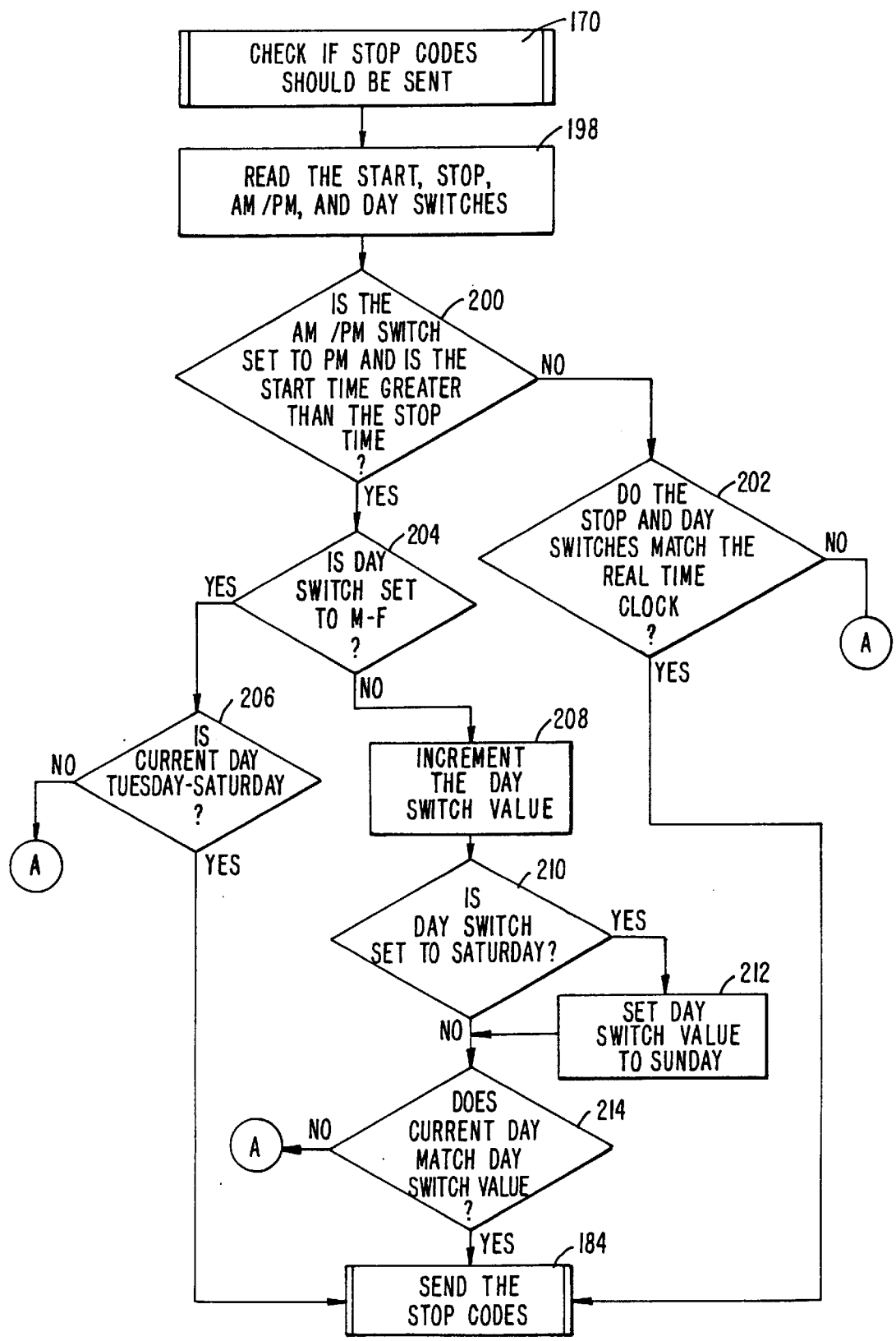
FIG. 5G is a flowchart showing the procedure of reading and comparing the record start, stop and day switch settings with the real time clock.

Another feature of the simplified VCR programmer 10, 40 is that it is able to determine the stop time without having an additional AM/PM selector switch for the stop time. This process is shown in the flowchart of FIG. 5G. In subroutine 170, the microprocessor 80 checks to see if the stop codes should be sent. First, the microprocessor 80 reads the record start time 86, stop time 90, AM/PM 88 and day 92 switches in step 198. Next it must be determined if the recording process starts in one day and extends and stops into the next day, i.e., an 11 PM start time with a 1 AM stop time. This is determined in step 200. The microprocessor 80 looks to see if the AM/PM switch 88 is set to PM and if the start time is greater than the stop time. In software, the hours 1–12 are set to 1–11, 0 respectively, with 12 being 0. Under same day recording, the microprocessor 80 monitors the switch settings to determine if the record stop 90 and day 92 switches match the real time clock in step 202. If they do, then the microprocessor 80 sends the stop codes to be transmitted in step 184. However, if the record time extends from one day into the next, the microprocessor 80 must determine the day switch 92 setting in step 204. If the day switch 92 is set to M–F and the current day is Tuesday through Saturday, step 206, then the microprocessor 80 sends the stop code to be transmitted to the VCR 60 in step 184. However, if the day switch 92 is not set to M–F, then the day switch value is incremented in software in step 208. The microprocessor 80 must then determine if the day switch value is set to Saturday in step 210. If it is, then the day switch value must be set to Sunday in software in step 212. However, if the day switch value is not set to Saturday and the current day as indicated by the real time clock matches the software's day switch value in step 214, then the microprocessor 80 sends the stop codes to be transmitted to the VCR 60 in step 184.

While the invention has been described with reference to preferred embodiments, those skilled in the art will appreciate that certain substitutions, alternations and omissions may be made without departing from the spirit thereof. Accordingly, the foregoing description is meant to be exemplary only and should not be deemed limitative on the scope of the invention set forth with the following claims.

I claim:

1. Apparatus for programming a video recorder wherein the video recorder is of a type which is one type of a plurality of video recorder types and each type of video recorder is programmed using a unique set of programming codes, the apparatus comprising:

at least one input component, used to enter at least one programming command; and a transmitter which transmits, in response to a programming command, a programming sequence of programming codes which comprise at least one programming code for each video recorder type of the plurality of video recorder types.

2. The apparatus of claim 1, further comprising a memory for storing the programming sequence and logic for transmitting the programming sequence more than once in response to the programming command.

3. The apparatus of claim 1, wherein the memory comprises storage locations for a start record sequence and a stop record sequence.

4. The apparatus of claim 1, wherein the memory comprises storage locations for a start record time and a stop record time.

5. The apparatus of claim 1, further comprising:

means for storing at least a start time and stop time defining a future recording period;

logic for activating the transmitter at a beginning of the future recording period to send a recording start sequence; and logic for activating the transmitter at an end of the future recording period to send a recording stop sequence.

6. The apparatus of claim 1, further comprising:

means for reading a start time from a start time dial;

means for reading a stop time from a stop time dial;

logic for activating the transmitter at the start time to send a recording start sequence; and logic for activating the transmitter at the stop time to send a recording stop sequence.

7. Apparatus for remotely programming a video recorder comprising:

a first dial for selecting a record start time;

a second dial, distinct from the first dial, for selecting a record stop time;

a memory for storing at least one video recorder start code and at least one video recorder stop code; and a transmitter for transmitting the at least one video recorder start code at a time indicated by the first dial and the at least one video recorder stop code at the time indicated by the second dial.

8. Apparatus for remotely programming a video recorder comprising:

a first dial for selecting a record start time;

a second dial, distinct from the first dial, for selecting a record stop time;

a transmitter for transmitting at least one video recorder start code at a time indicated by the first dial and at least one video recorder stop code at the time indicated by the second dial.

9. The apparatus of claim 8, wherein the at least one video recorder start code comprises a plurality of video recorder start codes, wherein each video recorder start code in the plurality of video recorder start codes is associated with a unique video recorder type.

10. The apparatus of claim 8, wherein the at least one video recorder stop code comprises a plurality of video recorder stop codes, wherein each video recorder stop code in the plurality of video recorder stop codes is associated with a unique video recorder type.

11. The apparatus of claim 8 further comprising:

a clock for generating a clock signal indicative of the current time;

an input switch for selecting a day of the week; and a display for displaying the current time and day of the week.

12. The apparatus of claim 8, wherein the first dial is a rotary dial switch with a twelve hour clock face and the second dial is a rotary dial switch with a twelve hour clock face.

13. The apparatus of claim 8, wherein the transmitter is a transmitter configured to output each code more than once.

14. Apparatus for programming a recorder wherein the recorder is of a type which is one type of a plurality of recorder types and each type of recorder is programmed using a unique set of programming codes, the apparatus comprising:

at least one input component, used to enter at least one programming command; and a transmitter which transmits, in response to a programming command, a programming sequence of programming codes which comprise at least one programming code for each recorder type of the plurality of recorder types.

15. A remote control for a video recorder comprising:

at least one input component, used to enter at least one programming command; and a transmitter which transmits, in response to a programming command, a programming sequence representing the at least one programming command, wherein the programming sequence is transmitted from the remote control to the video recorder more than once in response to the programming command, thereby increasing the probability that the programming sequence is received correctly at the video recorder.

16. Apparatus for remotely programming a video recorder comprising:

a first dial for selecting a record start time;

a second dial, distinct from the first dial, for selecting a record stop time; and a transmitter which transmits programming sequences to the video recorder including a video recorder start code and video recorder stop code.

17. The apparatus of claim 16, further comprising means for timing transmission such that the video recorder start code is transmitted at a time corresponding to the record start time and the video recorder stop code is transmitted at a time corresponding to the record stop time.

18. An apparatus for remotely programming a video recorder comprising:

a case enclosing circuitry including a transmitter, wherein the case has a first side and a second side which are approximately parallel and in different planes wherein each of the sides is stably restable upon a flat surface;

a first plurality of input control switches on the first side, wherein the first plurality of control switches controls a wide range of video recorder functions;

a first dial on the second side for selecting a record start time;

a second dial, distinct from the first dial, on the second side for selecting a record stop time;

memory means for storing a video recorder start code for each of a plurality of video recorder types and a video recorder stop code for each of the plurality of video recorder types; and logic circuitry for activating the transmitter to transmit at least one video recorder start code for each of the plurality of video recorder types at a time corresponding to the record start time and for transmitting at least one video recorder stop code for each of the plurality of video recorder types at a time corresponding to the record stop time.

19. The apparatus of claim 18 further comprising logic for transmitting video recorder codes multiple times to increase the probability of the codes being received correctly.

* * * * *